United States Patent [19]

Jones

[11] Patent Number: 4,513,108
[45] Date of Patent: Apr. 23, 1985

[54] THERMOPLASTIC PVC MOLDING COMPOSITIONS

[75] Inventor: Jesse D. Jones, Baton Rouge, La.

[73] Assignee: Ethyl Corporation, Richmond, Va.

[21] Appl. No.: 495,069

[22] Filed: May 16, 1983

[51] Int. Cl.$^3$ .............. C08L 27/06; C08L 23/28; C08L 25/08; C08L 55/02

[52] U.S. Cl. .................... 524/180; 525/71; 525/74; 525/207; 525/192; 524/507; 524/178; 524/179

[58] Field of Search ............ 525/71, 74, 207, 192; 524/180

[56] References Cited

U.S. PATENT DOCUMENTS

| | | | |
|---|---|---|---|
| 3,467,732 | 9/1969 | Schnebelen et al. | 525/192 |
| 4,311,806 | 1/1982 | Dufour | 525/71 |
| 4,329,272 | 5/1982 | Dufour | 524/288 |
| 4,345,040 | 8/1982 | Hall | 521/53 |

*Primary Examiner*—Carman J. Seccuro
*Attorney, Agent, or Firm*—Donald L. Johnson; John F. Sieberth

[57] ABSTRACT

A thermoplastic molding composition having high Izod Impact and heat deflection temperature is disclosed. This composition contains in intimate admixture: a vinyl chloride polymer; a copolymer of a vinyl aromatic compound and an α,β-unsaturated cyclic anhydride; as a first impact modifier, chlorinated polyethylene resin; and as a second impact modifier either a MBS impact modifier, an ABS impact modifier, a MABS impact modifier or a mixture thereof. This copolymer of a vinyl aromatic compound and an α,β-unsaturated cyclic anhydride can be rubber modified.

38 Claims, No Drawings

4,513,108

THERMOPLASTIC PVC MOLDING COMPOSITIONS

This invention relates to vinyl chloride polymer compositions of enhanced performance characteristics.

BACKGROUND

Vinyl chloride resins are widely used in the manufacture of various useful end products, including moldings, appliance cabinets, battery packs, etc. Unfortunately, unplasticized vinyl chloride resins used in the manufacture of rigid end products tend to have poor heat deformation characteristics. Consequently, they are unsuitable for use in certain areas of application where structural integrity under heat and load is of prime importance.

As reported in co-pending U.S. patent application, Ser. No. 209,843, filed by Jesse D. Jones and Edwin D. Hornbaker on Nov. 24, 1980, it has been discovered that blends of vinyl chloride polymers and copolymers of the styrene-maleic anhydride type can be formulated to have a number of superior performance characteristics, including increased resistance to heat deformation under load. The addition to these blends of impact modifier grades of: acrylonitrile and styrene grafted on polybutadiene or on styrene-butadiene copolymer rubber (ABS); styrene-methylmethacrylate grafted on polybutadiene or on styrene-butadiene copolymer rubber (MBS); and styrene-methyl methacrylate-acrylonitrile grafted on polybutadiene or on styrene-butadiene copolymer rubber (MABS), can provide articles with enhanced "toughness", i.e., an Izod Impact greater than about 0.8 lbs/in, and a heat deflection temperature measured at 66 psi of at least 75° C. A high value for the heat deflection temperature measured at 66 psi is important as such value is required for thermoplastics which are to be used in the production of products subject to both heat and load stresses, e.g., television cabinets, battery housings, etc.

A more economical impact modifier, i.e., chlorinated polyethylene, can provide sufficient "toughness" to articles injection molded from blends of polyvinyl chloride and copolymers of the styrene-maleic anhydride type. However, the use of this material or the impact modifier for these blends results in a deleteriously low heat deflection temperature measured at 66 psi. Thus, while the ABS, MBS and MABS type impact modifiers provide suitable physical properties, their cost makes them not the materials of choice in commercial blends, while, on the other hand, chlorinated polyethylene, while cost effective, does not provide acceptable heat deflection temperatures.

THE INVENTION

It has now been discovered that cost effective blends of vinyl chloride polymers and copolymers of the styrene-maleic anhydride type can be formulated to have a high Izod Impact and a high heat deflection temperature. These improved compositions are easily produced by known blending procedures and are readily suitable for use in commercially available injection molding machines.

The thermoplastic injection moldable blends of this invention comprise (a) a vinyl chloride polymer having a relative viscosity, as measured at a concentration of 1 gram per 100 grams of cyclohexanone at 25° C., falling within the range of from about 1.50 to about 1.85; (b) a thermoplastic copolymer having a number average molecular weight of at least thirty thousand and derived from a vinyl aromatic compound and an $\alpha,\beta$-unsaturated cyclic anhydride in which the relative proportions, in the copolymer, of the polymerized vinyl aromatic compound and the polymerized anhydride fall within the range of from about 90 to about 70 weight percent of the vinyl aromatic compound and from about 10 to about 30 weight percent of the anhydride; (c) as a first impact modifier, a chlorinated polyethylene resin; and (d) as a second impact modifier, either a MBS impact modifier, an ABS impact modifier, a MABS impact modifier or a mixture of two or more of these. Measured as parts by weight per hundred parts by weight of components (a) and (b), preferably, component (a) is present in an amount within the range of from about 80 to about 20 parts; component (b) is present in an amount within the range of from about 20 to 80 parts; component (c) is present in an amount within the range of from about 3 to about 20 parts and component (d) is present in an amount within the range of from about 3 to about 30 parts.

By replacing, with chlorinated polyethylene, a portion of the ABS, MBS or MABS impact modifiers normally used, an economically suitable blend is achieved. The use of chlorinated polyethylene as a partial replacement of ABS, etc., does not significantly, if at all, affect the heat deflection temperature measured at 66 psi. Further, favorable Izod Impact values are maintained. Articles injection molded from blends of this invention have an Izod Impact strength (ASTM D 256, Method A) of at least 0.8 foot pound per inch and a heat deflection temperature (ASTM D 648) at 66 psi of at least 75° C.

A further advantage of the use of chlorinated polyethylene is that due to its halogen content, it tends to enhance the flame resistance of ABS, MBS and MABS modified PVC/SMA blends.

In a preferred embodiment of the invention, the blend is made from a rubber-modified thermoplastic copolymer of a vinyl aromatic compound and an $\alpha,\beta$-unsaturated cyclic anhydride in which the copolymer has a number average molecular weight of at least thirty thousand. Here again, the relative proportions of the vinyl aromatic compound and the $\alpha,\beta$-unsaturated cyclic anhydride in the resin phase of the copolymer fall within the range of from about 90 to about 70 weight percent of the vinyl aromatic compound and from about 10 to about 30 weight percent of the cyclic anhydride, but in this case the graft copolymer contains up to about 33 parts (preferably 25 parts or less) by weight of the rubber per 100 parts by weight of the copolymer itself.

Hence, this invention also provides thermoplastic injection moldable blends which comprise: (a) a vinyl chloride polymer having a relative viscosity, as measured at a concentration of 1 gram per 100 grams of cyclohexanone at 25° C., falling within the range of from about 1.50 to about 1.85; (b) a rubber-modified thermoplastic copolymer of a vinyl aromatic compound and an $\alpha,\beta$-unsaturated cyclic anhydride in which the copolymer has a number average molecular weight of at least thirty thousand, the relative proportions, in the copolymer, of the vinyl aromatic compound and the anhydride fall within the range of from about 90 to about 70 weight percent of the vinyl aromatic compound and from about 10 to about 30 weight percent of the anhydride, and in which the graft copolymer contains up to 33 (preferably up to about 25) parts by weight of the rubber per 100 parts by weight of the copolymer; (c) as a first impact modifier, a chlorinated polyethylene resin; and (d) a MBS impact modifier, an ABS impact modifier, a MABS impact modifier or a mixture of two or more of these. Quantitatively, the relative amounts of components (a), (b), (c) and (d) for this just-described blend are the same as for the first-described blend of this invention.

Component (a), the vinyl choride resin, may be a homopolymer of vinyl chloride or a copolymer of vinyl chloride with a minor portion of one or more monomers copolymerizable with vinyl chloride. In such copolymers, vinyl chloride comprises, on a weight basis, at least about 90 percent of the copolymer and the copolymerizable monomer comprises up to about 10 percent. A wide variety of copolymerizable monomers may be used to prepare such vinyl chloride copolymers. These include vinylidene chloride; vinyl acetate and vinyl stearate; acrylic and methacrylic acid esters; olefins such as ethylene, propylene, isobutylene and the like; vinyl alkyl esters such as vinyl isobutyl ether, vinyl lauryl ether and vinyl cetyl ether; acrylic acid and methacrylic acid; acrylonitrile and methacrylonitrile; diethyl fumarate; maleic anhydride; dimethyl itaconate; N-vinyl carbazole; or mixtures thereof. Further, the vinyl chloride resins may include halogenated polyvinyl chloride and the like.

Methods for the preparation of vinyl chloride polymers as well known in the art and reported in the literature. See for example, Kirk-Othmer, *Encyclopedia of Chemical Technology,* Second Edition, Interscience Publishers, Volume 21, pages 369–412 (Copyright 1970), the disclosure of which is incorporated herein. Vinyl chloride polymers having suitable relative viscosities for use in the practice of this invention are available commercially. For best results, the relative viscosity (as measured at a concentration of 1 gram per 100 grams of cyclohexanone at 25° C.) of the vinyl chloride resin should fall within the range of about 1.50 to about 1.65 and accordingly the use of such vinyl chloride resins is preferred. Polyvinyl chloride homopolymer resins falling within this relative viscosity range are particularly preferred.

Component (b), copolymers containing, as the principal parts, a vinyl aromatic compound and an $\alpha,\beta$-unsaturated cyclic anhydride, are also well known in the art and are described in the literature. Minor amounts of other monomer units, e.g., acrylonitrile, may be present in the copolymer to modify its production and performance characteristics. In general, the copolymers may be prepared by conventional bulk or solution techniques using free-radical initiation. For example, styrene-maleic anhydride copolymers can be obtained by simply reacting the two monomers, i.e., styrene and maleic anhydride, at 50° C., in the presence of benzoyl peroxide. The polymerization may be more easily controlled if a solvent such as acetone, benzene, toluene or xylene is used.

Vinyl aromatic compounds of component (b) can be compounds of the formula:

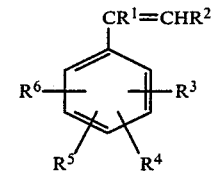

wherein $R^1$ and $R^2$ are independently selected from the group consisting of alkyl groups of from 1 to 6 carbon atoms and hydrogen; $R^3$, $R^4$, $R^5$ and $R^6$ may be concatenated together with hydrocarbyl groups to form a naphthyl group in which the vinylic substituent is preferably in the 1-position. All such compounds are free of any substituent that has a tertiary carbon atom. Preferred vinyl aromatics are the styrenes, i.e., compounds in which $R^2$ is hydrogen and $R^3$, $R^4$, $R^5$ and $R^6$ are independently hydrogen, alkyl of 1 to 6 carbon atoms, chlorine or bromine. Of these compounds, styrenes in which $R^1$ is hydrogen or methyl and $R^3$, $R^4$, $R^5$ and $R^6$ are independently hydrogen, methyl or ethyl are most preferred. Styrene itself is the most preferred vinyl aromatic compound.

The cyclic anhydride compounds of component (b) are preferably $\alpha,\beta$-unsaturated dicarboxylic anhydrides. For example, the term cyclic anhydride identifies anhydrides having the formula:

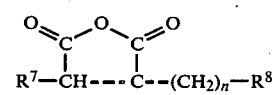

wherein the dash lines represent a single or a double carbon-to-carbon bond, $R^7$ is selected from the group consisting of hydrogen, alkyl or aryl radicals containing up to 8 carbon atoms, $R^8$ is selected from the group consisting of hydrogen, vinyl, alkyl, alkenyl, alkylcarboxylic or alkenylcarboxylic of from 1 to 12 carbon atoms and n is an integer of from 0 to about 10. Examples include maleic anhydride, methyl maleic anhydride, dimethyl maleic anhydride, citraconic anhydride, itaconic anhydride, phenylmaleic anhydride, aconitic anhydride, and mixtures thereof. Maleic anhydride is the preferred anhydride of component (b).

Copolymers of vinyl aromatic compounds and $\alpha,\beta$-unsaturated cyclic anhydrides which can be used in the practice of this invention are described in U.S. Pat. Nos. 2,769,804; 2,971,939 and 3,336,267, the disclosures of which are incorporated herein by reference.

As noted above, these copolymers can be and preferably are rubber-modified copolymers. In preparing these rubber-modified copolymers, use of such rubbers as polybutadiene, isobutylene-isoprene copolymers, styrene-butadiene copolymers, butadiene-acrylonitrile copolymers, ethylene-propylene copolymers, polyisoprene, ethylene-porpylene-diene monomer terpolymers (EPDM) and the like can be employed. In this connection, see U.S. Pat. No. 3,919,354, the disclosure of which is incorporated herein by reference.

As mentioned previously, component (b) copolymers, whether rubber-modified or not, comprise from about 90 to about 70 parts by weight of the vinyl aromatic compound and from about 10 to about 30 parts by weight of the $\alpha,\beta$-unsaturated cyclic anhydride copolymerized therewith. These copolymers have a number average molecular weight of at least thirty thousand and the relative proportions in the preferred type of copolymer, i.e., styrene-maleic anhydride compolymers, fall within the range of from about 86 to about 80 weight percent of the styrene monomer and from about 14 to about 20 weight percent of the anhydride monomer. Preferred rubber-modified copolymers used herein contain about 5 to 25 (most preferably 8 to 22) parts by weight of the rubber per 100 parts by weight of the styrene/anhydride copolymer, although lesser amounts, even down to trace amounts of rubber, are suitable.

In preferred blends of this invention, the ratio of the parts by weight of component (a) to the parts by weight of component (b) falls within the range of from about 30/70 to about 60/40. Most highly preferred are blends in which the ratio falls within the range of from about 40/60 to about 60/40.

Component (c) as before-mentioned is a chlorinated polyethylene resin. This resin is commercially available. For example, one grade of component (c) may be purchased from The Dow Chemical Company under the designation CPE 3615. This particular chlorinated polyethylene resin is reported to have a specific gravity of 1.16, a chlorine content of 36% and a melt viscosity measured as poise/1000 of 26.5. Other grades are also commercially available. As mentioned previously, the chlorinated polyethylene resin is present in the blend in an amount within the range of from about 3 to about 20 parts by weight per hundred parts by weight of components (a) and (b). Most preferably, the amount will be within the range of from about 6 to about 15 parts by weight per hundred parts of component (a) and (b).

Component (d) is an impact modifier and is either an ABS, a MBS, a MABS polymer or mixtures thereof. These polymers are well known and are available commercially. For example, a suitable ABS polymer for use in the blends of this invention is Blendex 101 Resin marketed by Borg Warner Corporation. Borg Warner also markets a suitable MABS polymer under the designation of Blendex 436 Resin. A suitable MBS polymer is Rohm and Haas Company's Acryloid KM 653. Component (d) polymers are preferably present in the blends of this invention in an amount within the range of from about 7 to about 25 parts by weight per one hundred parts by weight of components (a) and (b). Most preferably, the amount will be within the range of from about 10 to about 15 parts by weight per one hundred parts of components (a) and (b).

The blends of this invention can also include other ingredients, such as thermal stabilizers, fillers, processing aids, lubricants, pigments, flame retardants, smoke retardants, antioxidants, and the like, for their conventionally employed purposes.

For protection against thermal degradation, polyvinyl chloride stabilizers can be added to the compositions of this invention. Examples of suitable stabilizers are metal salts and soaps such as the laurates or stearates of barium, cadmium or zinc; the laurates and stearates of lead (e.g., monobasic and dibasic lead stearates), basic lead carbonate, basic lead sulfates, dibasic lead phosphite, dibasic lead phthalate, basic lead silicate, white lead, lead chlorosilicate, lead oxide, lead oxide-lead silicate mixtures and the like. It has been found beneficial, when using lead stabilizers, to add a melt viscosity suppressant to the blend. Exemplary of such a useful suppressant is Vynathene 902 which is marketed by U.S. Industrial Chemicals. The amount of suppressant used will be dependent upon the processing requirements of the user. Generally speaking, amounts of suppressant within the range of from about 2 to about 8 parts by weight per hundred parts by weight of components (a) and (b) will be useful.

A preferred embodiment of this invention uses tin stabilizers in the blends as such materials have been found particularly effective as polyvinyl chloride stabilizers. Exemplary of such tin stabilizers are di-n-alkyltin mercaptides, di-n-alkyltin dilaurates, dibutyltin dimaleate, dibutyltin lauryl mercaptide, di-n-octyltin-S,S'-bis-(isooctyl mercaptoacetate), dibutyltin-S,S'bis(isooctyl mercaptoacetate), di-n-octyltin maleate polymer, dibutyltin mercaptopropionate and the like.

The amount of stabilizer used can be varied. Normally the amount will range from about 1 to about 4 phr—i.e., about 1 to about 4 parts by weight per one hundred parts by weight of components (a) and (b).

Processing aids of various types are entirely suitable for use in the blends of this invention. For example, use may be made of such polyvinyl chloride processing aids as those made from copolymers of methyl methacrylate and styrene, terpolymers of methyl methacrylate, lower alkyl acrylate and acrylonitrile, or terpolymers of methyl methacrylate, lower alkyl acrylate and dialkyl itaconate, and the like. The preferred processing aids are methyl methacrylate-lower alkyl acrylate copolymers having a small portion (e.g., 3 to 15 percent) of the lower alkyl acrylate comonomer and having an inherent viscosity, as measured at a concentration of 0.25 grams per 100 milliliters of chloroform at 25° C., of at least 0.1 and preferable 0.5 or higher. A variety of such processing aids, including the preferred types, are available from various commercial sources. The amount of processing aid will generally range from about 0.5 to about 10 parts by weight per hundred parts by weight of components (a) and (b).

Typical lubricants which may be used in the blends of this invention include metal soaps, stearic acid, glyceryl monostearate, ethyl diaminostearate, mineral oil, paraffin and low molecular weight waxes, and the like. Conventional pigments used in polyvinyl chloride may likewise be used in the blends of this invention in conventional amounts. Ordinarily the concentration of lubricant and pigment will not exceed about 10 parts by weight per one hundred parts by weight of components (a) and (b).

If desired, small amounts of reinforcing fibers such as carbon filaments, asbestos, titanate whiskers, and glass fiber may be employed. The amount of such materials are added in amounts to achieve the desired performance properties. Ordinarily such reinforcing fiber would be used in lieu of a filler although small proportions of both materials may prove satisfactory.

Flame retarding additives which may be used in the compositions of the invention comprise a large number of chemical compounds which are well known to those skilled in the art. In general, they contain chemical elements which are used because of their flame-retarding capacity, for example, bromine, chlorine, antimony, phosphorus and nitrogen. Preferably, the use of flame-retarding additives comprises using a combination of flame retarding organic and inorganic compounds. Exemplary of suitable organic compounds are decabromodiphenyl oxide, octobromodiphenyl oxide, brominated polystyrene, etc. Suitable inorganic compounds are materials such as antimony compounds (e.g., antimony trioxide), zinc compounds (e.g., zinc borate), antimony-zinc complex compounds (e.g., Oncor 75RA, a product of NL Industries, Inc.), iron compounds (e.g., ferric oxide), and other metal based inorganic compounds which perform well with antimony oxide (e.g., Ongard 2, a product of NL Industries, Inc.). When using a flame retardant, the amount should be sufficient to yield a blend having a UL 94 rating of V-2 or better using test bars 0.060 inch thick.

Smoke suppressing additives may also be used. Examples include alumina trihydrate, cuprous cyanide, and combinations of nickel carbonate and zinc oxide. Very small amounts of organic phosphites and phenolic compounds are suitable as antioxidants.

The compositions of the invention may be prepared by blending the components in a mixer (e.g., a Henschel mixer) and compounding the mixture on an extruder (e.g., a Buss Ko-Kneader, a Farrel Continuous Mixer or a Killion compounding extruder). Thereafter, the extrudate is chopped into pellets and molded on an injection molding machine.

The present invention is further illustrated in the following examples, which are not to be construed as limiting.

In the Examples, various blends of this invention were prepared by the above-mentioned blending and compounding. The resultant pellets were injection molded on a New Britain injection molding machine at the following conditions:

Zone 1—310° F.
Zone 2—320° F.
Zone 3—330° F.
Nozzle—70%
Injection Speed—5 turns off maximum
Shot Size—1.25-1.3
Hold Time—5 seconds
Cooling Time—35 seconds
Mold Temperature, °F.—100/100
Injection Pressure—Maximum
Hold Pressure—1300 psi
Back Pressure—400 psi The individual components used in making up the various blends are identified in the Examples by their product designation. The following table identifies each component used.

| Component | Product Designation | Marketed and/or Manufactured by |
|---|---|---|
| polyvinyl chloride resin | SM-160 | Ethyl Corporation |
| styrene-maleic anhydride copolymer | DKB-218, 218-2 1116, 1117 | Arco Chemical Co., Inc. |
| organotin stabilizer | Thermolite-831 (T-831) | M & T Chemicals, Inc. |
| organotin stabilizer | Mark 1492 | Argus Chemical Co. Inc. |
| calcium stearate | Calcium Stearate (RSN11-4) | Mallinckrodt Chemical Works |
| mineral oil | Kaydol | Witco Chemical Corporation |
| acrylic polymer | Acryloid K-125 | Rohm and Haas Company |
| diphenyl isooctyl phosphite | Weston ODPP | Borg Warner Chemicals |
| styrene-maleic anhydride copolymer of 2/1 ratio | SMA 2000 | Arco/Chemical Co. |
| fatty acid ester | Vinylube 38 | Glyco Chemicals, Inc. |
| decabromodiphenyl oxide | Saytex 102 | Saytech, Inc. |
| antimony trioxide | Ultrafine II | PPG Industries |
| treated calcium carbonate | Winnofil S | ICI United States Inc. |
| chlorinated polyethylene | CPE-3614, 3615 | The Dow Chemical |

| Component | Product Designation | Marketed and/or Manufactured by |
|---|---|---|
| MBS | 3623A, X02443 Acryloid KM 653 | Company Rohm and Haas Company |
| ABS | Blendex 101 | Borg Warner Chemicals |
| MABS | Blendex 436 | Borg Warner Chemicals |

EXAMPLE I

Four blends of this invention were prepared using the following components:

| Components | Parts by Weight |
|---|---|
| SM-160 | 50 |
| Mark 1492 | 2 |
| Calcium Stearate | 2 |
| Kaydol | 2 |
| Acryloid K-125 | 2 |
| Vinylube 38 | 0.5 |
| DKB-1116* | 50 |
| Winnofil S | 3 |
| CPE-3614 | As listed |
| Acryloid KM-653 | As listed |

*(17% maleic anhydride in the resin phase, 10% rubber)

The blends were injection molded to yield test articles which had the physical properties shown in Table I.

TABLE I

| | Sample | | | |
|---|---|---|---|---|
| | 1 | 2 | 3 | 4 |
| CPE-3614, parts by weight | 10 | 10 | 12 | 8 |
| Acryloid KM-653, parts by weight | 10 | 12 | 12 | 12 |
| Physical Properties | | | | |
| Specific Gravity | 1.205 | 1.195 | 1.197 | 1.200 |
| Tensile Yield, psi | 4860 | 4710 | 4770 | 4770 |
| Tensile Elastic Modulus, 10³ psi | 277 | 252 | 276 | 288 |
| Elongation, % | 2.2 | 2.4 | 2.2 | 2.0 |
| Flexural Strength, psi | 9350 | 9220 | 9370 | 9430 |
| Flexural Elastic Modulus, 10³ psi | 316 | 314 | 322 | 336 |
| Izod Impact, ft-lb/in. | | | | |
| ¼ inch bar | 1.4 | 1.5 | 1.3 | 1.1 |
| ⅛ inch bar | 1.6 | 1.9 | 1.6 | 1.5 |
| Heat Deflection Temperature | | | | |
| °C. at 264 psi | 67 | 71.5 | 71 | 71 |
| °C. at 66 psi | 82 | 89.7 | 81 | 80 |
| Rockwell Hardness, R Scale | 93.8 | 92.8 | 94.5 | 95.8 |

EXAMPLE II

The effect of different grades of chlorinated polyethylene were studied in the following nine blends.

| Ingredients | Parts by Weight |
|---|---|
| SM-160 | 50 |
| Mark 1492 | 2 |
| Calcium Stearate | 2 |
| Kaydol | 2 |
| Acryloid K-125 | 2 |
| Vinylube 38 | 0.5 |
| Winnofil S | 3 |
| CPE | As Listed |
| Acryloid KM-653 | As Listed |

-continued

| Ingredients | Parts by Weight |
|---|---|
| DKB-1116 | 50 |

Test articles injection molded from these blends were evaluated for their physical properties. The results are shown in Table II.

TABLE II

| Sample | 1 | 2 | 3 | 4 | 5 | 6 | 7 | 8 | 9 |
|---|---|---|---|---|---|---|---|---|---|
| Chlorinated Polyethylene, | | | | | | | | | |
| Grade used | 3614 | 3615 | 3623A | X02443 | 3614 | 3614 | 3614 | 3614 | 3614 |
| Parts by weight | 10 | 10 | 10 | 10 | 10 | 12 | 10 | 8 | 12 |
| Acryloid KM-653, Parts by weight | 12 | 12 | 12 | 12 | 12 | 12 | 15 | 15 | 15 |
| Physical Properties | | | | | | | | | |
| Izod Impact, ft-lb/in. | | | | | | | | | |
| ¼ inch bar | 1.4 | 1.2 | 1.3 | 1.4 | 1.5 | 1.6 | 1.6 | 1.5 | 1.8 |
| ⅛ inch bar | 1.7 | 1.6 | 1.8 | 1.6 | 1.8 | 1.9 | 2.1 | 1.8 | 2.3 |
| Heat Deflection Temperature | | | | | | | | | |
| °C. at 264 psi | 69.5 | 72 | 69.1 | 69.5 | 79.5 | 72 | 71 | 79 | 71 |
| °C. at 66 psi | 82.0 | 89.7 | 86 | 79 | 82.1 | 85 | 85 | 82.5 | 82 |

EXAMPLE III

The physical properties of blends of this invention were studied as a function of the weight ratio of polyvinyl chloride (PVC) and styrene-maleic anhydride (SMA). The blends were as follows:

| Components | Parts by Weight |
|---|---|
| SM-160 | As Listed |
| DKB-1117 | As Listed |
| Mark 1492 | 2 |
| Calcium Stearate | 2 |
| Kaydol | 2 |
| Acryloid K-125 | 2 |
| Vinylube 38 | 0.5 |
| Acryloid KM-653 | 12 |
| CPE-3615 | 10 |
| Winnofil S | 3 |

The physical properties of test articles injection molded from these blends are shown in Table III.

TABLE III

| | Sample No. | | |
|---|---|---|---|
| | 1 | 2 | 3 |
| PVC/SMA Weight Ratio | 50/50 | 40/60 | 30/70 |
| Physical Properties | | | |
| Specific Gravity | 1.186 | 1.168 | 1.48 |
| Tensile Yield, psi | 4290 | 4190 | 3960 |
| Tensile Elastic Modulus, $10^3$ psi | 268 | 267 | 282 |
| Elongation, % | 2.3 | 1.9 | 2.9 |
| Flexural Strength, psi | 7930 | 7790 | 7540 |
| Flexural Elastic Modulus, $10^3$ psi | 285 | 292 | 289 |
| Izod Impact, ft-lbs/in. | | | |
| ¼ inch bar | 1.3 | 1.2 | 0.9 |
| ⅛ inch bar | 1.8 | 1.6 | 1.3 |
| Heat Deflection Temperature | | | |
| °C. at 264 psi | 74 | 74 | 77 |
| °C. at 66 psi | 84.5 | 88.1 | 87.1 |
| Rockwell Hardness, R Scale | 87.8 | 88.1 | 87.1 |

EXAMPLE IV

The following compositions of this invention were formulated and injection molded to yield test articles whose physical properties are shown in Table IV.

| Components | Parts by Weight |
|---|---|
| SM-160 | As Listed |
| Mark 1492 | 2 |
| Calcium Stearate | 2 |
| Kaydol | 2 |
| Acryloid K-125 | 2 |
| Vinylube 38 | 0.5 |
| CPE-3615 | 10 |
| Acryloid KM-653 | 12 |
| Winnofil S | 3 |
| styrene maleic anhydride copolymer | As Listed |

TABLE IV

| | Sample | | | |
|---|---|---|---|---|
| | 1 | 2 | 3 | 4 |
| PVC/SMA ratio | 50/50[a] | 50/50[a] | 40/60[b] | 40/60[b] |
| Physical Properties | | | | |
| Specific Gravity | 1.195 | 1.196 | 1.177 | 1.168 |
| Tensile Yield, psi | 4990 | 4750 | 4870 | 4190 |
| Tensile Elastic Modulus, $10^3$ psi | 317 | 256 | 317 | 267 |
| Elongation, % | 4.6 | 1.3 | 4.4 | 1.9 |
| Flexural Strength, psi | 8900 | 8380 | 8830 | 7790 |
| Flexural Elastic Modulus, $10^3$ psi | 315 | 303 | 323 | 292 |
| Izod Impact, ft-lb/in., 23° C. | | | | |
| ¼ inch bar | 1.1 | 1.2 | 0.9 | 1.2 |
| ⅛ inch bar | 1.4 | 1.6 | 1.2 | 1.6 |
| Izod Impact, ft-lb/in. | | | | |
| ⅛", 0° C. | 0.8 | | 0.8 | |
| ⅛", −40° C. | 0.6 | | 0.5 | |
| Heat Deflection Temperature | | | | |
| °C. at 264 psi | 74 | 72 | 78 | 74 |
| °C. at 66 psi | 96 | 90 | 101 | 94 |
| Heat Deflection Temperature (Annealed)[c] | | | | |
| °C. at 264 psi | 82 | | 93 | |
| °C. at 66 psi | 102 | | 107 | |
| Rockwell Hardness, R Scale | 97 | 94 | 98 | 88 |
| Vicat, °C. | 129 | | 133 | |

[a]DKB-1116
[b]DKB-1117
[c]2 Hr, 90° C.

EXAMPLE V

The following blends of this invention were formulated. Table V gives the physical properties of test articles injection molded from the various blends.

| Components | Parts by Weight |
|---|---|
| SM-160 | 40 |
| Mark 1492 | 2 |
| Calcium Stearate | 2 |
| Kaydol | 2 |
| Acryloid K-125 | 2 |
| Vinylube 38 | 0.5 |
| Winnofil S | 3 |
| DKB-218 | 60 |
| CPE-3615 | As Listed |
| Acryloid KM-653 | As Listed |

TABLE V

| Physical Properties | Sample | | | |
|---|---|---|---|---|
| | 1 | 2 | 3 | 4 |
| Acryloid KM-653, parts by weight | 12 | 15 | 15 | 15 |
| Acryloid CPE-3615, parts by weight | 10 | 10 | 12 | 14 |
| Physical Properties | | | | |
| Izod Impact, ft-lb/in. | | | | |
| ⅛ inch bar | 1.2 | 1.4 | 1.5 | 1.5 |
| ¼ inch bar | 1.6 | 1.6 | 1.7 | 1.9 |
| Heat Deflection Temperature | | | | |
| °C. at 264 psi | 82 | 84 | 82 | 85 |
| °C. at 66 psi | 92 | 95 | 95 | 97 |

EXAMPLE VI

In this Example, blends containing 60 parts by weight polyvinyl chloride and 40 parts by weight styrene-maleic anhydride were studied. The blends were as follows:

| Components | Parts by Weight |
|---|---|
| SM-160 | 60 |
| Mark 1492 | 2 |
| Calcium Stearate | 2 |
| Kaydol | 2 |
| Acryloid K-125 | 2 |
| Vinylube 38 | 0.5 |
| Winnofil S | 3 |
| DKB-218 | 40 |
| CPE-3615 | As Listed |
| Acryloid KM-653 | As Listed |

Injection molded test articles from these blends gave the results shown in Table VI.

TABLE VI

| Physical Properties | Sample | | | | | |
|---|---|---|---|---|---|---|
| | 1 | 2 | 3 | 4 | 5 | 6 |
| CPE-3615, parts by weight | 10 | 8 | 6 | 10 | 8 | 6 |
| Acryloid KM-653, parts by weight | 12 | 12 | 12 | 15 | 15 | 15 |
| Physical Properties | | | | | | |
| Izod Impact, ft-lb/in. | | | | | | |
| ⅛ inch bar | 1.5 | 1.4 | 1.2 | 1.6 | 1.6 | 1.3 |
| ¼ inch bar | 1.8 | 1.7 | 1.4 | 2.0 | 1.9 | 1.7 |
| Heat Deflection Temperature | | | | | | |
| °C. at 264 psi | 67 | 72 | 71 | 71 | 67 | 74 |
| °C. at 66 psi | 75 | 77 | 78 | 78 | 79 | 78 |

EXAMPLE VII

The effect of flame retardants in blends of this invention was studied in the following formulations.

| Component | Parts by Weight |
|---|---|
| SM-160 | 40 |
| T-831 | 2 |
| Calcium Stearate | 2 |
| Kaydol | 3 |
| Acryloid K-125 | 2 |
| CPE-3615 | 14 |
| Acryloid KM-653 | 15 |
| DKB-218-2 | 60 |
| Weston ODPP | 1 |
| SMA 2000 | 1 |
| Saytex 102 flame retardant | As Listed |
| Ultrafine II flame retardant | As Listed |

Injection molded test articles gave the results shown in Table VII.

TABLE VII

| Flame Retardancy | Sample | | | | |
|---|---|---|---|---|---|
| | 1 | 2 | 3 | 4 | 5 |
| Saytex 102 flame retardant, parts by weight | 6 | 6 | 6 | 6 | 6 |
| Ultrafine II flame retardant, parts by weight | 4 | 3.5 | 3.0 | 2.5 | 2.0 |
| Flame Retardancy | | | | | |
| UL-94 Unaged | V-0 | V-0 | V-1 | V-0 | V-1 |
| Aged | V-0 | V-0 | V-0 | V-1 | V-1 |

EXAMPLE VIII

Table VIII below illustrates the effectiveness of two flame retardents, Saytech 102 flame retardent and Ultrafine II flame retardent in blends of this invention slightly different from those in Example VII.

| Component | Parts by Weight |
|---|---|
| SM-160 | 40 |
| T-831 | 2 |
| Calcium Stearate | 2 |
| Kaydol | 2 |
| Acryloid K-125 | 2 |
| Vinylube 38 | 0.5 |
| Winnofil S | 3 |
| CPE-3615 | 10 |
| Acryloid KM-653 | 12 |
| DKB-218-2 | 60 |
| Weston ODPP | 1 |
| SMA 2000 | 1 |
| Saytech 102 flame retardant | As Listed |
| Ultrafine II flame retardant | As Listed |

Test articles were injection molded and tested.

TABLE VIII

| Sample | 1 | 2 | 3 | 4 | 5 | 6 | 7 | 8 | 9 |
|---|---|---|---|---|---|---|---|---|---|
| Saytex 102 flame retardent, parts by weight | 5 | 5 | 5 | 6 | 6 | 6 | 7 | 7 | 7 |

TABLE VIII-continued

|  | 1 | 2 | 3 | 4 | 5 | 6 | 7 | 8 | 9 |
|---|---|---|---|---|---|---|---|---|---|
| Ultrafine II flame retardent, parts by weight | 3 | 4 | 5 | 4 | 5 | 6 | 5 | 6 | 7 |
| Flame Retardancy |  |  |  |  |  |  |  |  |  |
| UL-94 Unaged | Fail | V-1 | Fail | V-0 | V-0 | V-0 | V-0 | V-0 | V-0 |
| Aged | Fail | V-0 | V-0 | V-0 | V-0 | V-0 | V-0 | V-0 | V-0 |

EXAMPLE IX

The following Example illustrates that chlorinated polyethylene can be substituted for a portion of the ABS, MBS and MABS impact modifier present in polyvinyl chloride/styrenemaleic anhydride blends without significant deleterious effect on the Izod Impact and heat deflection temperatures at 66 psi. The blends used for the Examples are as follows:

| Components | Parts by Weight |
|---|---|
| SM-160 | 50 |
| T-831 | 2 |
| Calcium Stearate | 2 |
| Kaydol | 3 |
| Acryloid K-125 | 2 |
| Weston ODPP | 1 |
| SMA-2000 | 1 |
| Saytex 102 | 2 |
| Ultrafine II | 2 |
| DKB-218 | 50 |
| CPE-3615 | As Listed |
| Acryloid KM-653 | As Listed |
| Blendex 101 | As Listed |
| Blendex 436 | As Listed |

Test articles were injection molded from the blends and their physical properties are shown in Table IX.

TABLE IX

|  | 1 | 2 | 3 | 4 | 5 | 6 | 7 |
|---|---|---|---|---|---|---|---|
| Samples |  |  |  |  |  |  |  |
| CPE-3615, parts by weight | 22 |  |  |  | 10 | 10 | 10 |
| Acryloid KM-653, parts by weight |  | 22 |  |  | 12 |  |  |
| Blendex-101, parts by weight |  |  | 22 |  |  | 12 |  |
| Blendex-436, parts by weight |  |  |  | 22 |  |  | 12 |
| Physical Properties |  |  |  |  |  |  |  |
| Specific Gravity | 11.227 | 1.179 | 1.190 | 1.297 | 1.199 | 1.210 | 1.203 |
| Tensile Yield, psi | 4590 | 5220 | 5590 | 5210 | 4870 | 5150 | 4930 |
| Tensile Elastic Modulus, $10^3$ psi | 292 | 317 | 362 | 296 | 293 | 339 | 331 |
| Elongation, % | 1.9 | 2.5 | 1.6 | 2.1 | 2.0 | 1.8 | 2.1 |
| Flexural Strength, psi | 8020 | 8970 | 9990 | 8960 | 8590 | 9140 | 8460 |
| Flexural Elastic Modulus, $10^3$ psi | 302 | 304 | 369 | 302 | 301 | 339 | 301 |
| Izod Impact, ft-lb/in, |  |  |  |  |  |  |  |
| ¼ inch bar | 1.30 | 1.40 | .70 | 1.20 | 1.40 | .80 | 1.20 |
| ⅛ inch bar | 1.30 | 1.80 | .80 | 1.60 | 1.60 | .90 | 1.60 |
| Heat Deflection Temperature |  |  |  |  |  |  |  |
| °C. at 264 psi | 70° | 71.5° | 73.1° | 71.5° | 71.1° | 73° | 71.0° |
| °C. at 66 psi | 73° | 81.7° | 87° | 81° | 81° | 86° | 81.5° |
| Rockwell Hardness, R Scale | 87.8 | 93.8 | 105.5 | 94.6 | 93.0 | 100.0 | 92.4 |
| Vicat, °C. | 100° | 110.3° | 107° | 109.5° | 105.4° | 106.9° | 105° |

As can be seen from Table IX, the utilization of only chlorinated polyethylene as the impact modifying system yields an article having acceptable Izod Impact but having a relatively low heat deflection temperature at 66 psi, i.e., 73° C. Samples 2, 3 and 4 used, solely and respectively, a MBS, ABS and MABS impact modifier. In these samples, the Izod Impact was generally acceptable and the heat deflection temperatures at 66 psi were relatively high, i.e., 81.7° C., 87° C. and 81° C., respectively. When portions of the MBS, ABS and MABS impact modifiers were replaced by chlorinated polyethylene, Samples 5, 6 and 7, neither the Izod Impact nor the heat deflection temperatures at 66 psi were significantly adversely affected. Thus, in the polymer blends of this invention, chlorinated polyethylene exhibits unique behavior. When used as the sole impact modifier, at levels sufficient to provide acceptable impact strength, it causes the blend to have a relatively low heat deflection temperature. But when used in combination with the second impact modifier of this invention, the blend has a substantially higher heat deflection temperature. These results, therefore, show that blends of polyvinyl chloride and styrene-maleic anhydride can accept a cost-effective impact modifier system composed of chlorinated polyethylene and impact modifier grades of a MBS, an ABS, a MABS or mixtures thereof while still providing commercially valuable injection moldable articles suitable for those uses where "toughness" and resistance to deformation under heat are important.

I claim:

1. A thermoplastic molding composition which comprises in intimate admixture:
   (a) a vinyl chloride polymer having a relative viscosity, as measured at a concentration of 1 gram per 100 grams of cyclohexanone at 25° C., falling within the range of from about 1.50 to about 1.85;
   (b) a copolymer of a vinyl aromatic compound and an α,β-unsaturated cyclic anhydride having a number average molecular weight of at least 30,000 and in which the content of said vinyl aromatic compound is within the range of from about 90 to about 70 weight percent and the content of said anhydride is within the range of from about 10 to about 30 weight percent;
   (c) as a first impact modifier, at least 3 parts by weight per hundred parts of components (a) and (b) of chlorinated polyethylene resin; and (d) as a second impact modifier, at least 3 parts by weight per hundred parts of components (a) and (b) of either a MBS impact modifier, an ABS impact modifier, a MABS impact modifier or a mixture of two or more of these, articles produced from said molding composition having a heat deflection temperature measured at 66 PSI of at least 75° C.

2. A composition of claim 1 wherein (b) is a copolymer of a styrene and maleic anhydride.

3. A composition of claim 1 wherein (b) is a copolymer of styrene and maleic anhydride in which the relative proportions fall within the range of from about 86 to 80 weight percent of styrene and within the range of from about 14 to about 20 weight percent of maleic anhydride.

4. A composition of claim 1 wherein (a) is polyvinyl chloride.

5. A composition of claim 1 wherein (a) is polyvinyl chloride having a relative viscosity as measured at a concentration of 1 gram per 100 grams of cyclohexanone at 25° C. falling within the range of from about 1.50 to about 1.65.

6. A composition of claim 1 wherein (a) is polyvinyl chloride and (b) is a copolymer of a styrene and maleic anhydride.

7. A composition of claim 1 wherein (a) is polyvinyl chloride having a relative viscosity, as measured at a concentration of 1 gram per 100 grams of cyclohexanone at 25° C., falling within the range of from about 1.50 to about 1.65, and (b) is a copolymer of styrene and maleic anhydride in which the relative proportions fall within the range of from about 86 to about 80 weight percent of styrene and the range of from about 14 to about 20 weight percent of maleic anhydride.

8. A composition of claim 1 wherein said composition additionally includes a tin containing thermal stabilizer for polyvinyl chloride.

9. A composition of claim 1 wherein said composition additionally contains either di-n-octyltin-S,S'-bis(isooctyl mercaptoacetate) or dibutyltin-S,S'-bis(isooctyl mercaptoacetate).

10. A composition of claim 1 wherein said composition has, measured as parts by weight per hundred parts by weight of (a) and (b), within the range of from about 80 to about 20 parts (a) and within the range of from about 20 to about 80 parts (b).

11. A composition of claim 1 wherein (c) is present in an amount within the range of from about 3 to about 20 parts by weight per hundred parts by weight of (a) and (b).

12. A composition of claim 1 wherein (d) is present in an amount within the range of from about 3 to about 30 parts by weight per hundred parts by weight of (a) and (b).

13. A composition of claim 10 wherein (c) is present in an amount within the range of from about 3 to about 20 parts by weight per hundred parts by weight of (a) and (b) and wherein (d) is present in an amount within the range of from about 3 to about 30 parts by weight per hundred parts by weight of (a) and (b).

14. A composition of claim 13 wherein (a) is polyvinyl chloride and (b) is a copolymer of a styrene and maleic anhydride.

15. A composition of claim 14 wherein (a) is polyvinyl chloride having a relative viscosity, as measured at a concentration of 1 gram per 100 grams of cyclohexanone at 25° C., falling within the range of from about 1.50 to about 1.65, and (b) is a copolymer of styrene and maleic anhydride in which the relative proportions fall within the range of from about 86 to about 80 weight percent of styrene and the range of from about 14 to about 20 weight percent of maleic anhydride.

16. A composition of claim 13 wherein said admixture additionally includes a tin containing thermal stabilizer for polyvinyl chloride, which stabilizer is present in an amount within the range of from about 1 to about 4 parts by weight per hundred parts by weight of (a) and (b).

17. A composition of claim 15 wherein said admixture additionally contains, as a thermal stabilizer, either di-n-octyltin-S,S'-bis(isooctyl mercaptoacetate) or dibutyltin-S,S'-bis(isooctyl mercaptoacetate).

18. The composition of claim 15 wherein said composition additionally contains frame retarding amounts of a flame retarding organic compound and a frame retarding inorganic compound.

19. The composition of claim 17 wherein said flame retarding organic compound is decabromodiphenyl oxide and said flame retarding inorganic compound is antimony trioxide.

20. A thermoplastic molding composition which comprises in intimate admixture:
(a) a vinyl chloride polymer having a relative viscosity, as measured at a concentration of 1 gram per 100 grams of cyclohexanone at 25° C., falling within the range of from about 1.50 to about 1.85;

(b) a rubber-modified graft copolymer of a vinyl aromatic compound and an α,β-unsaturated cyclic anhydride in which said rubber-modified graft copolymer contains up to 33 parts by weight of the rubber per 100 parts by weight of the copolymer and in which the copolymer has a number average molecular weight of at least 30,000 and has said vinyl aromatic compound present in an amount within the range of from about 90 to about 70 weight percent and said anhydride present in an amount within the range of from about 10 to about 30 weight percent;

(c) as a first impact modifier, at least 3 parts by weight per hundred parts of components (a) and (b) of chlorinated polyethylene resin; and (d) as a second impact modifier, at least 3 parts by weight per hundred parts of components (a) and (b) of either a MBS impact modifier, an ABS impact modifier, a MABS impact modifier or a mixture of two or more of these, articles produced from said molding composition having a heat deflection temperature measured at 66 PSI of at least 75° C.

21. A composition of claim 20 wherein the copolymer moiety in (b) is a copolymer of a styrene and maleic anydride.

22. A composition of claim 20 wherein the copolymer moiety in (b) is a copolymer of styrene and maleic anhydride in which the relative proportions fall within the range of from about 86 to 80 weight percent of styrene and within the range of from about 14 to about 20 weight percent of maleic anhydride.

23. A composition of claim 20 wherein (a) is polyvinyl chloride.

24. A composition of claim 20 wherein (a) is polyvinyl chloride having a relative viscosity, as measured at a concentration of 1 gram per 100 grams of cyclohexanone at 25° C., falling within the range of from about 1.50 to about 1.65.

25. A composition of claim 20 wherein (a) is polyvinyl chloride and (b) is a copolymer of a styrene and maleic anhydride.

26. A composition of claim 20 wherein (a) is polyvinyl chloride having a relative viscosity, as measured at a concentration of 1 gram per 100 grams of cyclohexanone at 25° C., falling within the range of from about 1.50 to about 1.65, and the copolymer moiety in (b) is a copolymer of styrene and maleic anhydride in which the relative proportions fall within the range of from about 86 to about 80 weight percent of styrene and the range of from about 14 to about 20 weight percent of maleic anhydride.

27. A composition of claim 20 wherein said composition additionally includes a tin containing thermal stabilizer for polyvinyl chloride.

28. A composition of claim 20 wherein said composition additionally contains either di-n-octyltin-S,S'-bis-(isooctyl mercaptoacetate) or dibutyltin-S,S'-bis(isooctyl mercaptoacetate).

29. A composition of claim 20 wherein said composition has, measured as parts by weight per hundred parts by weight of (a) and (b), within the range of from about 80 to about 20 parts (a) and within the range of from about 20 to about 80 parts (b).

30. A composition of claim 20 wherein (c) is present in an amount within the range of from about 3 to about 20 parts by weight per hundred parts by weight of (a) and (b).

31. A composition of claim 20 wherein (d) is present in an amount within the range of from about 3 to about 30 parts by weight per hundred parts by weight of (a) and (b).

32. A composition of claim 29 wherein said (c) is present in an amount within the range of from about 3 to about 20 parts by weight per hundred parts by weight of (a) and (b) and wherein (d) is present in an amount within the range of from about 3 to about 30 parts by weight per hundred parts by weight of (a) and (b).

33. A composition of claim 32 wherein (a) is polyvinyl chloride and the copolymer moiety in (b) is a copolymer of a styrene and maleic anhydride.

34. A composition of claim 33 wherein (a) is polyvinyl chloride having a relative viscosity, as measured at a concentration of 1 gram per 100 grams of cyclohexanone at 25° C., falling within the range of from about 1.50 to about 1.65, and the copolymer moiety in (b) is a copolymer of styrene and maleic anhydride in which the relative proportions fall within the range of from about 86 to about 80 weight percent of styrene and the range of from about 14 to about 20 weight percent of maleic anhydride.

35. A composition of claim 32 wherein said admixture additionally includes a tin containing thermal stabilizer for polyvinyl chloride, which stabilizer is present in an amount within the range of from about 1 to about 4 parts by weight per hundred parts by weight of (a) and (b).

36. A composition of claim 34 wherein said admixture additionally contains, as a thermal stabilizer, either di-n-octyltin-S,S'-bis(isooctyl mercaptoacetate) or dibutyltin-S,S'-bis(isooctyl mercaptoacetate).

37. The composition of claim 34 wherein said composition additionally contains flame retarding amounts of a flame retarding organic compound and a flame retarding inorganic compound.

38. The composition of claim 36 wherein said flame retarding organic compound is decabromodiphenyl oxide and said flame retarding inorganic compound is antimony trioxide.

* * * * *